(12) United States Patent
Liu

(10) Patent No.: US 6,341,926 B1
(45) Date of Patent: Jan. 29, 2002

(54) CUTTING TOOL

(76) Inventor: Lien-Huang Liu, No. 97 Lane 192, Shui Yuan Rd., Feng Yang City, Taichung Hsien, R.O.C. (TW)

( * ) Notice: Subject to any disclaimer, the term of this patent is extended or adjusted under 35 U.S.C. 154(b) by 0 days.

(21) Appl. No.: 09/512,055

(22) Filed: Feb. 24, 2000

(51) Int. Cl.⁷ .................................................. B23B 15/00
(52) U.S. Cl. ........................ 408/226; 408/226; 408/222
(58) Field of Search ................................. 408/226, 227, 408/222, 239 R; 470/198

(56) References Cited

U.S. PATENT DOCUMENTS

| 2,740,974 | A | * | 4/1956 | Lewis | 408/222 |
| 5,152,642 | A | * | 10/1992 | Pitts et al. | 408/226 |
| 5,299,105 | A | | 3/1994 | Arntzen | 362/119 |
| 5,934,385 | A | | 8/1999 | Svensson | 173/177 |

* cited by examiner

Primary Examiner—A. L. Wellington
Assistant Examiner—Terrence Washington
(74) Attorney, Agent, or Firm—Troxell Law Office PLLC

(57) ABSTRACT

A cutting tool includes a working portion adapted to cut a threaded hole or a hole in a predetermined workpiece, a first clamp portion provided at an end opposite to the working portion and adapted to be clamped by a clamping device to facilitate local application of force, and a weak portion disposed between the working portion and the first clamp portion and adapted to bear a torsional force smaller than that borne by other portions. The weak portion, during use of the cutting tool in a cutting operation, is always located on the surface of the workpiece and will break when the cutting tool cannot stand an excessive torsion. The broken portion will likewise always be located on the surface of the workpiece, whereby the user can easily clamp the portion exposed on the outside of the workpiece.

19 Claims, 3 Drawing Sheets

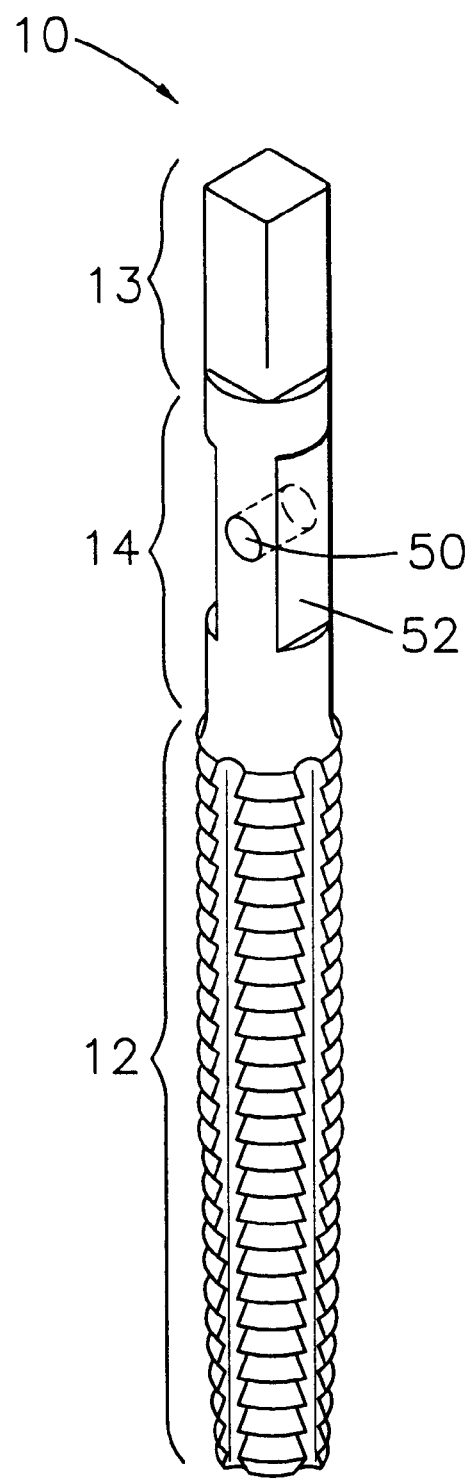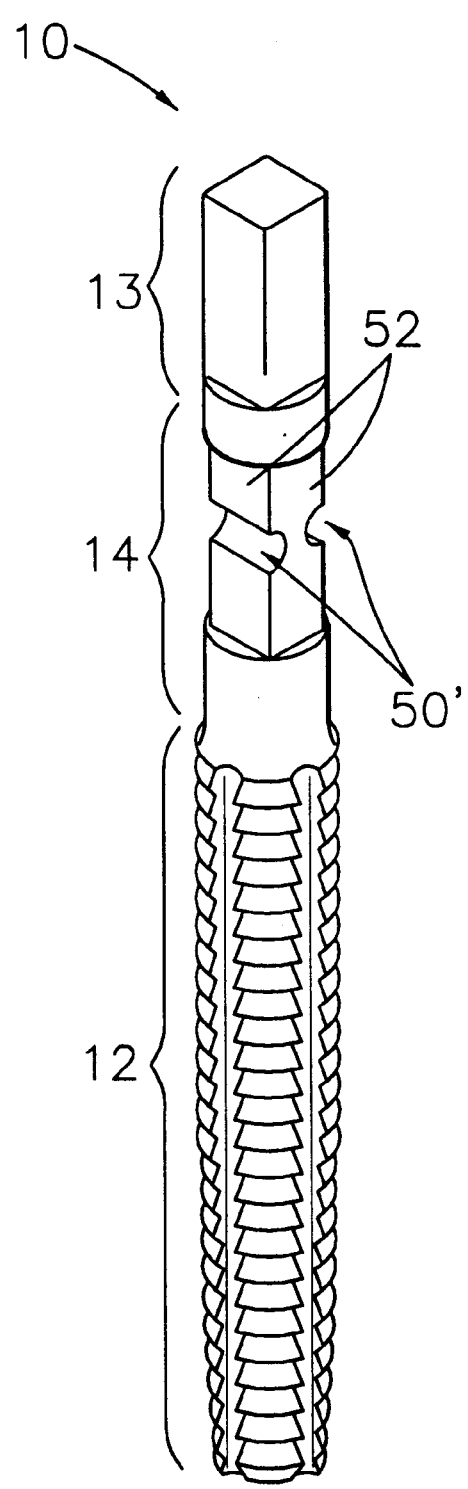

CUTTING TOOL

BACKGROUND OF THE INVENTION

1. Field of the Invention

The present invention relates to a tool that advances in a spiral manner to make a through hole, a recess or a threaded hole in a workpiece, more particularly to an improved cutting tool that, even when damaged or broken, can still be utilized.

2. Description of the Prior Art

A conventional cutting tool used to make a through hole or a recessed hole (whether it is threaded), regardless of whether it is for manual operation for use with a mechanical device, generally includes an elongated rod of a certain length and is formed in sequence along an axial direction thereof with a working portion at one end having teeth or blades for cutting workpieces, a clamp portion at the other end for holding by the user with an appropriate tool so as to turn along a predetermined direction, and an extension connected between the working portion and the clamp portion.

Take the ordinary tap as an example. In use, since the tap has to be disposed in a hole having an internal diameter smaller than its external diameter, and has to be turned back and forth to thereby cut the inner wall of the hole and to remove scraps. In addition, to facilitate operation, the distal end of the working portion is configured to be a taper having a gradually reduced external diameter. During the process of the user turning the tap back and forth, the tap may easily break, especially at the distal end of the working portion, and the broken portion is usually located in the hole and tightly stuck in the hole that is being processed. This is a big problem for the user since the making of the thread hole is not yet finished and the broken tap stuck in the hole is difficult to remove.

In an attempt to solve the above-mentioned problem, U.S. Pat. No. 5,299,105-discloses the pouring of a lubricant into a threaded hole to facilitate removal of a broken tap from the threaded hole. However, since lubricant cannot penetrate into the threads, the effect is not satisfactory. U.S. Pat. No. 5,934,385 teaches the use of a pressurized fluid to control or drive the tap. However, the construction is complicated and costly, and is therefore not widely adopted.

SUMMARY OF THE INVENTION

A primary object of the present invention is to provide a new cutting tool that allows easy removal of a broken part from the workpiece.

Another object of the present invention is to provide a cutting tool that, although broken, has a part remaining on the surface of the workpiece to allow the user to operate to thereby remove the broken part.

A further object of the present invention is to provide a cutting tool that prevents the most possible breakage from occurring at the working portion.

Still another object of the present invention is to provide cutting tool that when a part other than the working portion thereof is broken, has the remaining parts connected to the working portion to allow the user to continue the cutting operation.

In order to achieve the above-mentioned objects, the cutting tool according to the present invention includes a working portion adapted to cut a threaded hole or a hole in a predetermined workpiece, a first clamp portion provided at an end opposite to the working portion and adapted to be clamped by a clamping device to facilitate local application of force, and a weak portion disposed between the working portion and the first clamp portion and adapted to bear a torsional force smaller than that borne by other portions. The weak portion, during use of the cutting tool in a cutting operation, is always located on the surface of the workpiece and will break when the cutting tool cannot stand an excessive torsion. The broken portion will likewise always be located on the surface of the workpiece, whereby the user can utilize the second clamp portion to continue with the processing operation or to remove the broken portion from the workpiece.

BRIEF DESCRIPTION OF THE DRAWINGS

The foregoing and other features and advantages of the present invention will be more clearly understood from the following detailed description and the accompanying drawings, in which.

FIG. 3 is a perspective view of the third preferred embodiment of the present invention;

FIG. 4 is a perspective view of the fourth preferred embodiment of the present invention;

DETAILED DESCRIPTION OF THE PREFERRED EMBODIMENT

To facilitate the description of the structural features of the present invention, in the following description of the embodiments and drawings, a tap that is capable of making a threaded hole in a workpiece (not shown) is used as an example all through. But in actual practice, the structure features may also be adapted for use in a drill to make a through hole or recessed hole in a workpiece.

Figure 1:
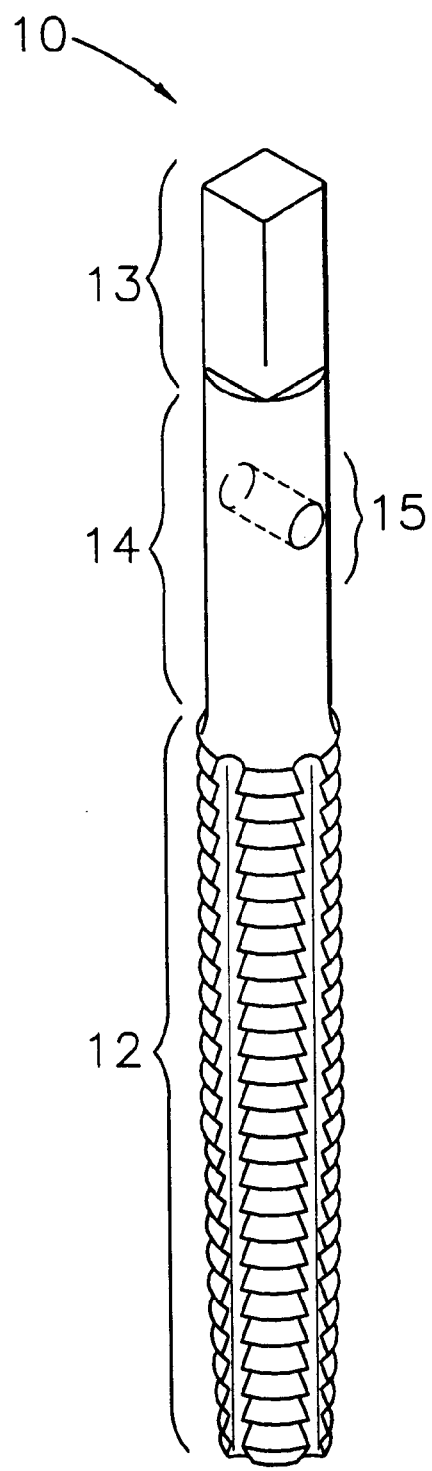
FIG. 1 is a perspective view of the first preferred embodiment of the present invention.

With reference to FIG. 1, a tap 10 according to the present invention has the same long shaft as conventional taps, and includes a working portion 12 at a lower end to cut out internal threads in a through hole (not shown) of a workpiece, a first clamp portion 13 at an upper end adapted to be clamped by a suitable tool by the user, and an extension 14 connecting the working portion 12 and the first clamp portion 13.

The present invention is characterized in that the extension 14 is formed with a weak portion 15. The weak portion 15 has a through hole 50 running through a part between opposite edges of the extension 14 such that the part cuts through the sectional area of the axial direction of the tap 10, smaller than the sectional area of other parts of the tap 10, such as the working portion 10, the first clamp portion 13, and the other parts of the extension 14. Hence, [the] under the condition that the overall material of the tap 10 is consistent and the unit area strengths are equivalent, the ability of the weak portion 15 to withstand torsion is comparatively poor.

Based on the aforesaid construction, when the user clamps the first clamp portion 13 with a mechanical device or a hand tool, with the working portion 12 inserted into a hole of a workpiece. During the cutting process of the working portion 12 to form a threaded hole in the inner wall of the workpiece, once the force applied is excessive, the weak portion 15 will break.

As mentioned above, since the extension 14 of the weak portion 15 is provided at an upper portion of the working portion 12 of the tap 10 and does not have a cutting function, it is always located outside the surface of the workpiece when at work. Therefore, once the weak portion 15 above it breaks, the extension will remain outside the surface of the workpiece to allow the user to easily rotate the extension 14 to remove the work portion 12 from the workpiece.

In the present invention, the direction of the axis center of the through hole 50 is not necessary as that shown in FIG. 1, i.e. perpendicular to the longer axial direction. In actual practice, the axis center may be disposed to include an inclination (not shown) of less than 90 degrees with the longitudinal axis of the extension 14. This is also one feasible way of forming the weak portion 15.

Figure 2:
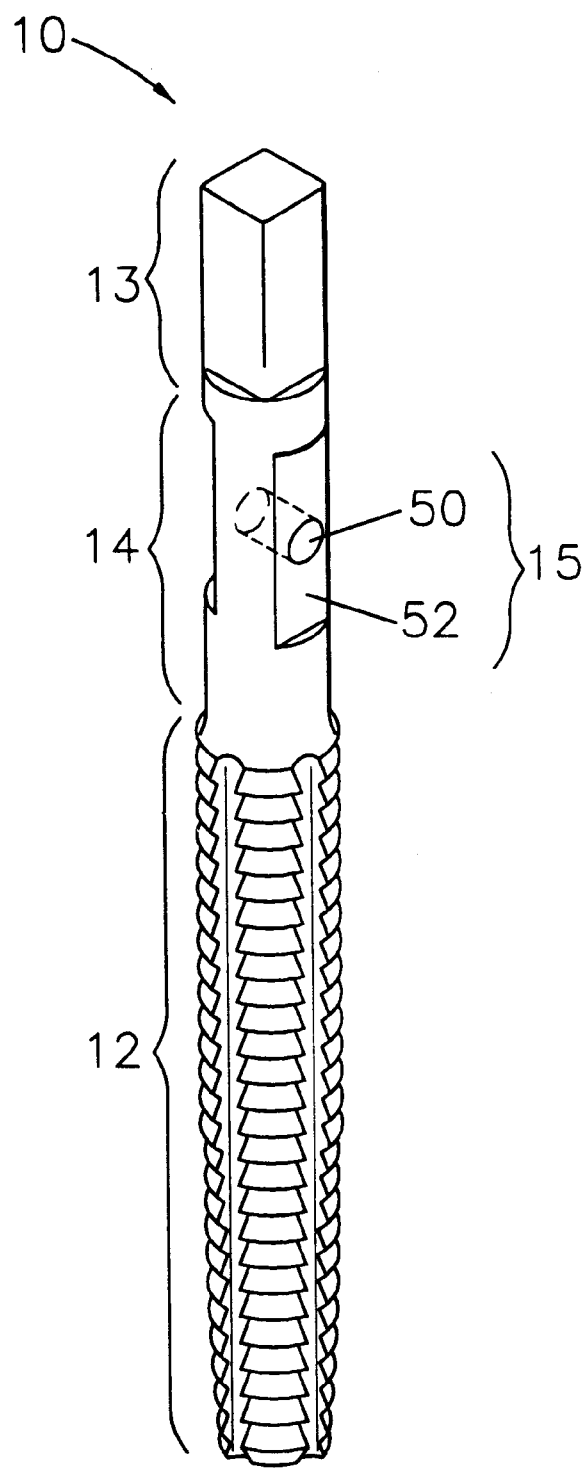
FIG. 2 is a perspective view of the second preferred embodiment of the present invention.

With reference to FIGS. 2 and 3, to facilitate picking out of the broken tap 10 from the workpiece using hand tool or mechanical device at hand, the outer edges of the extension 14 may be additionally provided with two second clamping portions 52. In these two embodiments, two planar portions spaced 180 degrees from each other on opposite outer edges of the extension 14 constitute the two second clamping portions 52.

By means of the structure of the two second clamping portions 52, after the user has removed from the tool the broken first clamp portion 13 that is detached from the extension, he can clamp the two clamping portions 52 to continue with the tapping operation, or remove the working portion 12 directly from the workpiece.

Furthermore, in these two embodiments, the through hole 50 is configured to be communicated with the two planar second clamping portions 52 or through the outer edges of the extension 14 not provided with the planar faces.

Certainly, the position of the through hole 50 may also be configured to be higher or lower than each of the second clamping portions 52 so that it is located intermediate of the two second clamping portions 52 and the first clamp portion 13 or between each of the second clamping portions 52 and the working portion 12.

With reference to FIG. 4, the second clamping portion 52 is shown to be a rectangular post having four planar faces with certain material cut off. Two inter-parallel grooves 50' are provided in place of the weak portion 15. The two grooves 50" may be configured to run transverse through two opposite planar faces or to be communicated with lateral edges of two opposite planar faces.

Figure 5:
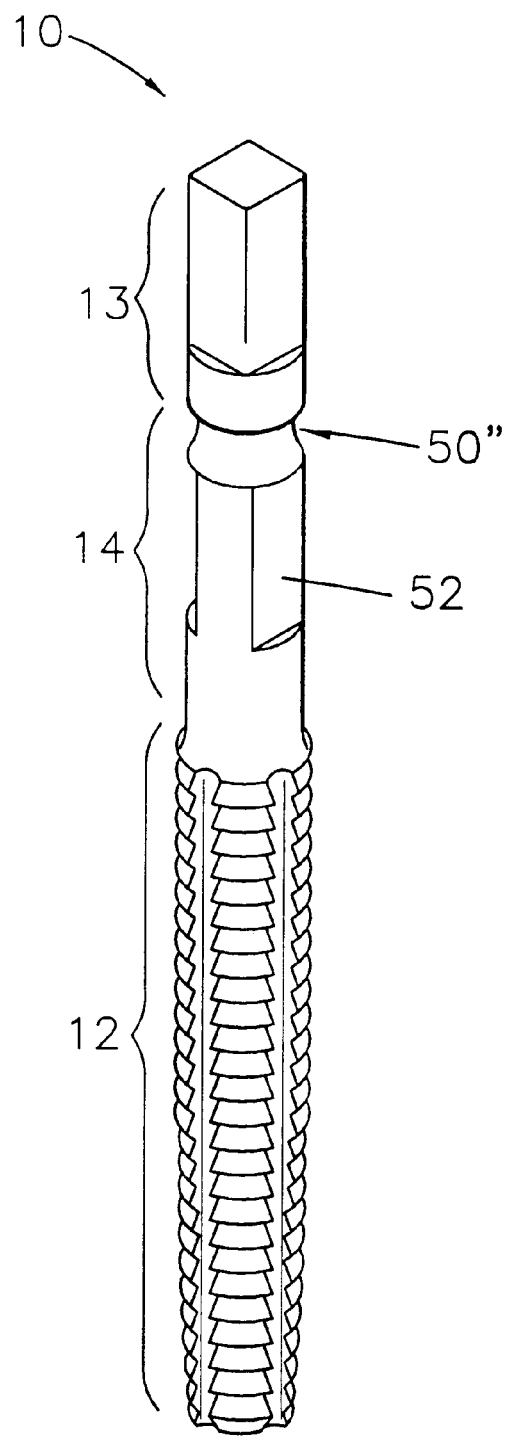
FIG. 5 is a perspective view of the fifth preferred embodiment of the present invention.

Referring to FIG. 5, an annular groove 50" is provided on the extension 14 to form the weak portion 15. It can therefore be appreciated that the sectional area of the weak portion 15 can be reduced and the shape of the section of the weak portion 15 can be altered. As long as a suitable amount of material is cut away from the outer edges of interior of the extension 14, for example, to form a plurality of differently shaped recessed holes in the outer edges of the extension 14, such should all fall within the scope of the appended claims.

Figure 6:
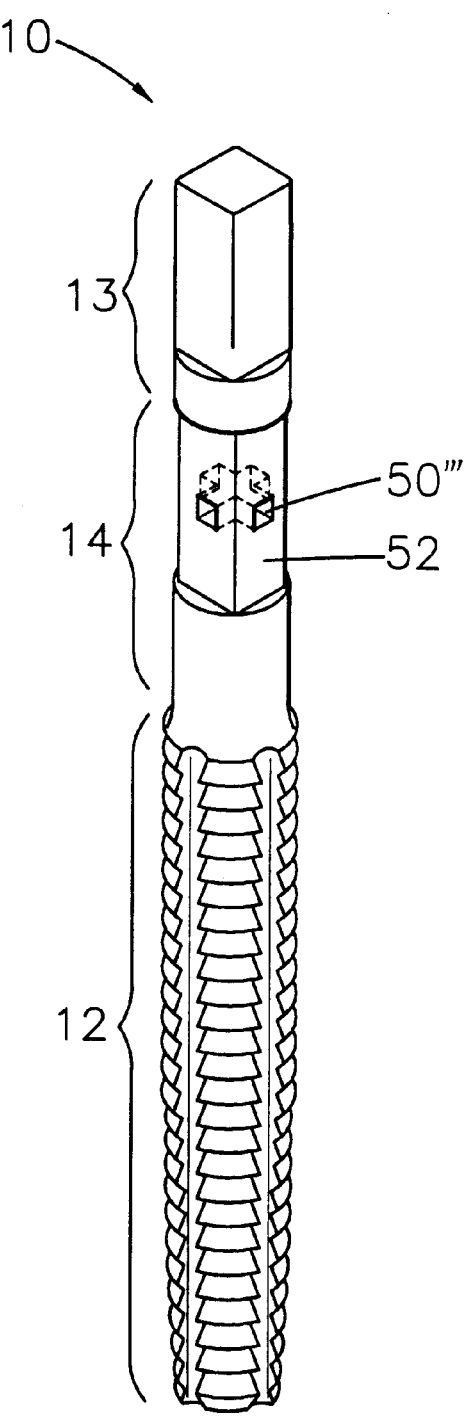
FIG. 6 is a perspective view of the sixth preferred embodiment of the present invention.

Referring to FIG. 6, the weak portion is formed by two rectangular holes 50''' that cross each other and have their two ends passing through the peripheral edges of the extension 14. Each rectangular hole 50''' has a section the shape of which is generally rectangular, whereby when the weak portion 15 of the tap 10 breaks, each rectangular hole 50''' will become exposed due to rupture in the form of recessed grooves. Hence, the user may use a conventional screwdriver to turn the extension 14 connecting the working portion 12 via the exposed recessed grooves to remove the same from the workpiece. Certainly, the rectangular holes 50''' are only a preferred example of the present invention. In actual practice, the shape of their section may be configured to be regular, irregular, triangular or other polygons.

It should be noted that although taps are used as examples in the above-described embodiments, if the working portion 12 is configured to be spiral extending blade, the cutting tool 10 is then an ordinary drill head with the same structural features and effects as described above. In addition, the above-mentioned first clamp portion 13 may be configured to be a rectangular post or a cylindrical post or any other suitable shape.

Although the present invention has been illustrated and described with reference to the preferred embodiment thereof, it should be understood that it is in no way limited to the details of such embodiment but is capable of numerous modifications within the scope of the appended claims.

What is claimed is:

1. A cutting tool having a rod shape and comprising:
   a working portion provided with a plurality of cutting blades;
   a first clamp portion provided on said cutting tool at an end opposite to said working portion and adapted for clamping by a clamping device to facilitate an application of force;
   a second clamp portion provided between said working portion and said first clamp portion and adapted for easy local application of force by a clamping device to clamp said cutting tool; and
   a weak portion provided between said working portion and said first clamp portion capable of bearing a torsional force smaller than that borne by each of said working portion and said second clamp portion, wherein said second clamp portion is disposed intermediate of said weak portion and said first clamp portion.

2. The cutting tool as defined in claim 1, wherein said cutting tool includes two second clamp portions, said two second clamp portions are respectively provided above and below said weak portion.

3. The cutting tool as defined in claim 1, wherein a cross-sectional area of said weak portion of said cutting tool is smaller than cross-sectional areas of the other portions of the cutting tool.

4. The cutting tool as defined in claim 1, wherein said weak portion comprises a groove provided in an outer surface of the cutting tool.

5. A cutting tool having a rod shape and comprising:
   a working portion provided with a plurality of cutting blades;
   a first clamp portion provided on said cutting tool at an end opposite to said working portion and adapted for clamping by a clamping device to facilitate an application of force;
   a second clamp portion provided between said working portion and said first clamp portion and adapted for easy local application of force by a clamping device to clamp said cutting tool; and
   a weak portion provided between said working portion and said first clamp portion capable of bearing a torsional force smaller than that borne by each of said working portion and said second clamp portion, wherein said second clamp portion has a predetermined length extending along a longitudinal axial direction of the cutting tool, said weak portion being provided on said second clamp portion such that said second clamp portion has one portion located above said weak portion with another portion located below said weak portion.

6. The cutting tool as defined in claim 5, wherein a cross-sectional area of said weak portion is smaller than cross-sectional areas of the other portions of the cutting tool.

7. The cutting tool as defined in claim 5, wherein said second clamp portion includes a pair of planar faces provided on outer surfaces of the cutting tool.

8. The cutting tool as defined in claim 7, wherein said weak portion includes a through hole communicating with said two planar faces.

9. The cutting tool as defined in claim 7, wherein said weak portion includes a through hole that goes through the outer surface of the cutting tool not provided with said two planar faces.

10. A cutting tool having a rod shape and comprising:
   a working portion provided with a plurality of cutting blades;
   a first clamp portion provided on said cutting tool at an end opposite to said working portion and adapted for clamping by a clamping device to facilitate an application of force;
   a second clamp portion provided between said working portion and said first clamp portion and adapted for easy local application of force by a clamping device to clamp said cutting tool; and
   a weak portion provided between said working portion and said first clamp portion capable of bearing a torsional force smaller than that borne by each of said working portion and said second clamp portion, wherein said weak portion includes a through hole going through said cutting tool.

11. The cutting tool as defined in claim 10, wherein a cross-sectional area of said weak portion is smaller than cross-sectional areas of the other portions of the cutting tool.

12. The cutting tool as defined in claim 10, wherein said second clamp portion includes a pair of planar faces provided on an outer surface of the cutting tool.

13. The cutting tool as defined in claim 12, wherein said through hole communicates with said two planar faces.

14. The cutting tool as defined in claim 12, wherein said through hole that goes through the outer surface of the cutting tool is not provided with said two planar faces.

15. A cutting tool having a rod shape and comprising:
   a working portion provided with a plurality of cutting blades;
   a first clamp portion provided on said cutting tool at an end opposite to said working portion and adapted for clamping by a clamping device to facilitate an application of force;
   a second clamp portion provided between said working portion and said first clamp portion and adapted for easy local application of force by a clamping device to clamp said cutting tool; and
   a weak portion provided between said working portion and said first clamp portion capable of bearing a torsional force smaller than that borne by each of said working portion and said second clamp portion, wherein said weak portion includes at least one recess having a predetermined depth and provided in an outer surface of the cutting tool.

16. The cutting tool as defined in claim 15, wherein said second clamp portion has a predetermined length extending along a longitudinal axial direction thereof, said weak portion being provided on said second clamp portion such that said second clamp portion has one portion located above said weak portion with another portion located below said weak portion.

17. The cutting tool as defined in claim 15, wherein a cross-sectional area of said weak portion is smaller than cross-sectional areas of the other portions of the cutting tool.

18. The cutting tool as defined in claim 15, wherein said at least one recess includes a groove.

19. The cutting tool as defined in claim 15, wherein said at least one recess comprises an annular groove.

\* \* \* \* \*